United States Patent [19]
Fanelli et al.

[11] Patent Number: 5,746,957
[45] Date of Patent: May 5, 1998

[54] GEL STRENGTH ENHANCING ADDITIVES FOR AGAROID-BASED INJECTION MOLDING COMPOSITIONS

[75] Inventors: Anthony Fanelli, Rockaway; Mohammad Behi, Lake Hiawatha; Clifford Palmer Ballard, Jr., Lebanon; Joan V. Burlew, Rockaway, all of N.J.

[73] Assignee: AlliedSignal Inc., Morris Township, N.J.

[21] Appl. No.: 796,012

[22] Filed: Feb. 5, 1997

[51] Int. Cl.$^6$ .................................................. C04B 35/64
[52] U.S. Cl. ...................... 264/109; 264/621; 264/328.2; 419/36
[58] Field of Search .................................. 264/621, 669, 264/109, 328.2; 419/36

[56] References Cited

U.S. PATENT DOCUMENTS

| | | | |
|---|---|---|---|
| 4,113,480 | 9/1978 | Rivers. | |
| 4,734,237 | 3/1988 | Fanelli et al. | 264/122 |
| 5,250,251 | 10/1993 | Fanelli et al. | 264/328.2 |
| 5,258,155 | 11/1993 | Sekido et al. | 264/109 |
| 5,286,767 | 2/1994 | Rohrbach et al. | 524/27 |
| 5,397,520 | 3/1995 | Rohrbach et al. | 264/122 |

*Primary Examiner*—Mary Lynn Theisen
*Attorney, Agent, or Firm*—Ernest D. Buff

[57] ABSTRACT

Parts from ceramic and/or metal powder(s) are shaped by a process that comprises the steps of (1) forming a mixture comprising ceramic and/or metal powder(s), a gel-forming material chosen from the class of polysaccharides known as "agaroids", a gel-forming solvent, and a gel strength enhancing agent, and said mixture being formed in a blender that provides a shearing action and being heated to raise the temperature of the mixture to about 70° C. to 100° C.; and (2) molding the mixture at a temperature sufficient to produce a self-supporting structure comprising the powder and gel. The parts exhibit excellent green strength and are rapidly fired without cracking, distortion or shrinkage problems.

3 Claims, 1 Drawing Sheet

INJECTION MOLDING PROCESS

GEL STRENGTH ENHANCING ADDITIVES FOR AGAROID-BASED INJECTION MOLDING COMPOSITIONS

BACKGROUND OF THE INVENTION

1. Field of the Invention

This invention relates to a process and molding composition for shaping metallic and ceramic parts from powder; and more particularly to a molding process and composition for forming high quality, complex parts which exhibit excellent green strength and which can be readily fired without experiencing the cracking, distortion and shrinkage problems commonly associated with sintered products.

2. Description of the Prior Art

Several forming methods for ceramic bodies are commonly practiced. In one popular shape forming method, namely, slip casting, a liquid suspension of ceramic powder is "de-watered" in a porous mold, producing a powder cake in the shape dictated by the mold. Dry pressing involves compaction of a powder in a die. The powder usually contains a processing aid which serves as plasticizer and/or binder for the green compact.

One objective of any forming method is to produce green parts which can be sintered to a shape reproducible to close dimensional tolerances, free from defects. During green-forming and sintering, cracks, distortions and other defects can arise due to shrinkage associated with the particle consolidation processes. It is generally recognized that these defect-producing processes are mitigated by producing green bodies of high green strength which reduces the tendency of the part to slump, distort or crack before it is fired.

Another objective of shape-forming methods is to produce articles having net shape, eliminating or minimizing the need for downstream operations, such as machining, to obtain final part dimensions. Dry pressing, in particular, frequently requires additional downstream processing in the form of machining and diamond grinding to attain intricate shapes, non-symmetrical geometrical formats and close tolerances.

Injection molding is recognized as a premier net-shape forming method for ceramic and metal powders. A critical attribute of a binder to be used in injection molding compositions is the ability to provide sufficient green strength to prevent warping and distortions after the shaped part is removed from the supporting structure (mold). The use of polysaccharides as binders for injection molding is disclosed in U.S. Pat. No. 4,734,237.

Successful fabrication of parts from ceramic and/or metal powders may depend critically on the strength of the as-molded part in the wet state as it is removed from the die. High as-molded strength can be especially important in the case of complex parts composed of adjacent thick and thin sections in order to prevent cracking, slumping, warping and loss of dimensional control. For these cases it may be desirable to enhance the strength of the material over the strength provided by the polysaccharide binder through use of additives.

The complexation and crosslinking of alkali borates with long chain polyhydroxylic compounds (polyols), such as guar and other natural gums as well as poly(vinyl alcohol) is well known (R. E. Sachachat, L. Z. Raymond. "Adv. Chem. Ser." 25, 11 (1960)). For example, the remarkable increase in viscosity of poly(vinyl alcohol) in the presence of small amounts of sodium borate (borax) is a popular laboratory demonstration (E. Z. Casassa, A. M. Sarquis and C. H. Van Dyke, "J. Chem. Educ.," 3, 57 (1986).

Boric acid species have been used in injection molding compositions containing polymeric, water-soluble binders. Use of small amounts of boric acid in aqueous injection molding compositions based on methyl cellulose binder for fabricating parts from metal powders is disclosed by U.S. Pat. No. 4,113,480. Although not clearly described, the function of the boric acid presumably is to increase the gel strength of the as-molded parts.

Use of sodium borate in aqueous injection molding compositions containing agar is specified in U.S. Pat. No. 5,258,155. The purpose of the sodium borate is to increase the binding strength of the as-molded articles. The author states that in the presence of 0.3 wt % sodium borate the strength of a gel prepared from 2 wt % agar in magnetically treated water is increased by a factor of eight. The author further states that application of heat and kneading to the agar/sodium borate solutions produces viscosities equivalent to or greater than those of conventional plastic binders.

Although the mechanism of the crosslinking reaction by borate has been the subject of much debate, the overwhelming evidence suggests that the crosslinking mechanism consists of an ionic monodiol-borate complex which interacts strongly with sodium counter ions that are coordinated to the polyhydroxylic chain. The mechanism has been described and the nature of the complexation drawn schematically by M. Shibayama, M. Saito, Y. Kimura, H. Fujiwara and S. Nomura, "Polymer", 29, 336 (1988).

In agreement with the proposed mechanism, it is clearly recognized that the crosslinking reaction is significantly weaker when boric acid is used as the complexing species. This explanation ascribes a crucial role to the sodium ion in the crosslinking reaction. Indeed, the large body of literature relating to the borate/polyhydroxylic compound complexation/crosslinking phenomena has dealt with boric acid and its sodium salt.

In certain applications sodium may be detrimental to the ultimate properties of interest in the fired ceramic article. For example, in structural ceramics the grain boundary phase can exert strong influence over the strength and deformation behavior at high temperatures. The grain boundary phase is frequently a glassy entity, distinct from the morphology and composition of the main body of the ceramic. Alkaline earth ions, such as sodium and potassium, are known to lower the softening point and the viscosity of these glassy compositions. The presence of sodium can therefore lower the upper use temperature of structural materials through reduction in strength and increase in creep rate at elevated temperatures.

As another example, dielectric strength is an important performance criterion of ceramic insulators, such as those used in spark plug applications. Insufficient dielectric strength can limit applications for a ceramic material. Alkaline earth ions, such as sodium, have a deleterious effect on the insulator properties of a ceramic material through lowering of the dielectric strength.

SUMMARY OF THE INVENTION

The present invention provides an aqueous molding composition and process useful in forming ceramic and/or metal articles. More specifically, in accordance with the invention, there is provided a process for shaping parts from ceramic and metal powders which comprises the steps of forming a mixture comprising ceramic and/or metal powder(s), a gel-forming material chosen from the class of polysaccharides known as agaroids, a gel-forming material solvent, and a gel strength enhancing agent having the form of a borate compound selected from the group consisting of calcium borate, magnesium borate, zinc borate ammonium borate, tetramethylammonium borate and boric acid, the mixture being formed in a blender that provides shearing action thereto and the blender being heated to raise the temperature of the mixture to about 70° C. to 100° C., and preferably about 80° C. to 95° C.; supplying the mixture to a mold, and molding the mixture under conditions of temperature and pressure to produce a self-supporting structure.

The invention is also drawn to an injection molding process comprising the steps of forming a mixture comprising ceramic and/or metal powder(s), a gel-forming material chosen from the class of polysaccharides known as agaroids, a gel-forming material solvent and a gel strength enhancing additive having the form of a borate compound selected from the group consisting of calcium borate, magnesium borate, zinc borate, ammonium borate, tetraethylammonium, tetramethylammonium borate and boric acid, the mixture being formed in a blender that provides shearing action thereto and the blender being heated to raise the temperature of the mixture to about 70° C. to 100° C., and preferably about 80° C. to 95° C.; injecting the mixture at a temperature above the gel point of the gel-forming material into a mold, cooling the mixture in the mold to a temperature below the gel point of the gel-forming material to produce a self-supporting structure and removing the structure from the mold.

On the basis of the critical role played by the alkali metal ion in the crosslinking mechanism, it is surprising that we have been able to find certain alternate borate compounds that provide sufficient gel strength enhancement at low concentration, particularly borate compounds of calcium, magnesium, zinc and ammonium. It is important to realize the difference in effectiveness among the various cationic species, as will become evident when attention is drawn to gel strength data summarized in Table 1. As will be seen, ammonium is less effective than the divalent metal cations and no enhancement is observed when the counterion is solely tetramethylammonium.

BRIEF DESCRIPTION OF THE FIGURE

The invention will be more fully understood and further advantages will become apparent when reference is made to the following detailed description and the accompanying drawing, in which:

The sole FIGURE is a schematic representation of the basic steps of one embodiment of the process of the invention.

DETAILED DESCRIPTION OF THE INVENTION

Figure 1:
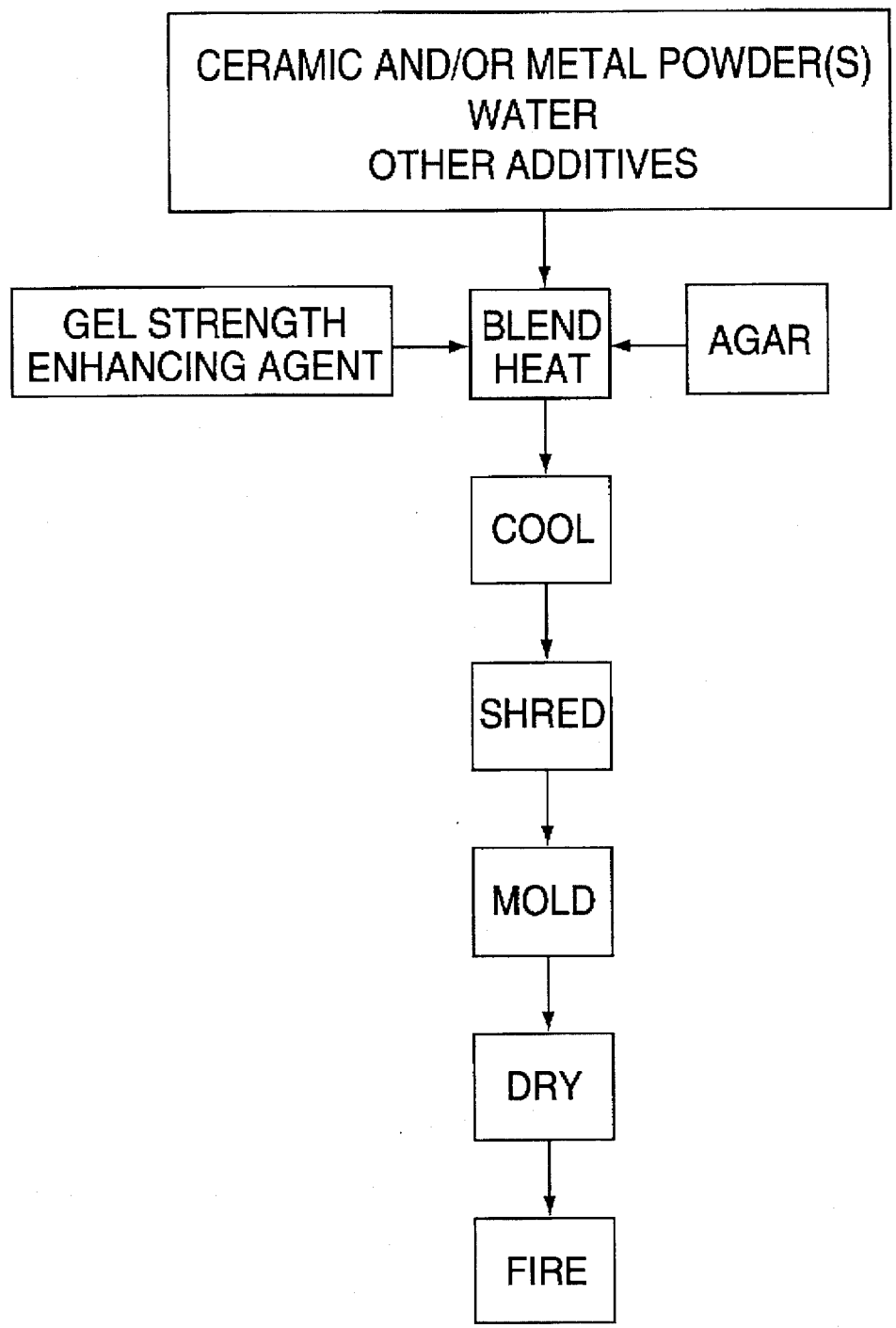

Ceramic, metal and metal/ceramic composite parts are formed according to this invention from powdered materials selected from metal powders, ceramic powders and mixtures thereof. As used therein, the term metal powders includes powders of pure metals, alloys, intermetallic compounds, and mixtures thereof. The term ceramic powders as used herein is intended to include, without limitation, powders of such materials as oxides, borides, nitrides, silicides, and carbides of metals, nonmetals or mixtures thereof, and mixtures of such materials.

According to the process of this invention, the metal and/or ceramic powder is initially mixed with a gel-forming material and a solvent for the gel-forming material. This mixture is proportioned with a carrier to be fluid enough to enable it to be readily supplied to a die by any of a variety of techniques, and especially by injection molding. Generally, the amount of powder in the mixture is between about 35% and 60% by volume of the mixture. Preferably, the powder constitutes between about 40% and about 58% by volume of the mixture, and most preferably constitutes between about 45% and 55% by volume of the mixture. The preferred and most preferred amounts are especially suited for production of net and near net shape injection molded parts.

The gel-forming material employed in the mixture comprises an agaroid. An agaroid has been defined as a gum resembling agar but not meeting all of the characteristics thereof (See H. H. Selby et al., "Agar", Industrial Gums, Academic Press, New York, N.Y., 2nd ed., 1973, Chapter 3, p. 29). As used herein, however, agaroid not only refers to any gums resembling agar, but also to agar and derivatives thereof such as agarose. An agaroid is employed because it exhibits rapid gelation within a narrow temperature range, a factor which can dramatically increase the rate of production of articles. The preferred gel-forming materials are those which are water soluble and comprise agar, agarose, or carrageenan, and the most preferred gel-forming materials consist of agar, agarose, and mixtures thereof In the instant invention, the gel-forming material is mixed with a gel strength enhancing additive chosen from the class of borate compounds comprising but not limited to calcium, magnesium, zinc and ammonium.

It is to be understood that the class of borate compounds that may be advantageously employed within the scope of the instant invention is very broad. Borate compounds, other than sodium borate, that are potential gel strength enhancing agents in agaroid-based injection molding compositions are delineated in such compendiums as "Boron Compounds" appearing in "Encyclopedia of Chemical Technology", Kirk-Othmer, 4th edition, Vol. 4, pp. 365–413, John Wiley, 1992, and "Powder Diffraction File", Alphabetical Index, Sets 1–43, International Centre for Diffraction Data, 1993. Examples of potentially useful borate compounds taken from these sources are as follows: borate compounds of ammonium, aluminum, barium, bismuth, cadmium, calcium, cerium, cesium, chromium, cobalt, copper, dysprosium, erbium, europium, gadolinium, germanium, iron, lanthanum, lead, lithium, lutetium, magnesium, manganese, mercury, neodymium nickel, rubidium, silver, strontium, tetraethylammonium, tetramethylammonium, thallium, thorium, titanium, vanadium, ytterbium, yttrium and zinc. The class of borates includes hydrates and hydroxides of the compounds as well as mixed cationic species, e.g., calcium magnesium borate hydrate, etc.

The use of such gel-forming materials in combination with a gel strength enhancing additive substantially reduces the amount of binder needed to form a self-supporting article. Thus, articles produced by using gel-forming materials comprising agaroids in combination with gel strength enhancing additives chosen from a specific class of borate compounds can significantly enhance the production of net shape and near net shape objects. Moreover, the production of complex articles from agaroid-containing mixtures with gel strength enhancing borate compounds is dramatically improved as a result of the higher strength and deformation resistance of the molded object.

The advantages of the instant invention will be understood when reference is made to Table 1, in which the strengths of 2 wt % aqueous agar gels are compared in the presence of certain borate compounds.

TABLE 1

Effect of Borate Compounds on Strength of Agar Gels

| Borate | Gel Strength, g/cm$^2$ |
| --- | --- |
| None (control) | 817 ± 07 |
| Calcium (0.3 wt %) | 1412 ± 51 |
| Calcium (0.45 wt %) | 1522 ± 51 |
| Magnesium (0.3 wt %) | 1164 ± 37 |
| Magnesium (0.45 wt %) | 1265 ± 41 |
| Zinc (0.3 wt %) | 1090 ± 12 |
| Ammonium (0.3 wt %) | 948 ± 54 |
| Ammonium (0.5 wt %) | 929 ± 60 |
| Tetramethylammonium (0.3 wt %) | 846 ± 34 |
| Boric Acid (0.3 wt %) | 832 ± 60 |

The following describes the procedures used in preparing and measuring the gel strengths of the gels appearing in Table 1.

The gels listed in Table 1 were heated in a microwave oven to 95° C. to dissolve the agar and then placed in a 25° C. water bath for 1 h before determining the gel strength. Deionized water was used for preparing the gels. The pH of the water was maintained between 6.5 and 8.0 using tetramethylammonium hydroxide as necessary. The strength measurements were made using an ATS (Applied Test Systems, Inc.) mechanical testing machine. One end of an aluminum rod was threaded and attached to the load cell and the other end was ground flat and machined to a diameter corresponding to an area of 1 cm$^2$. At the start of the test the beaker containing the gel was placed on the crosshead and the surface of the gel contacted against the flat end of the aluminum rod. Movement of the crosshead was initiated at a constant speed of 0.1"/min and the compressive load recorded. The maximum load recorded before puncture (signaled by a rapid fall-off in load) was taken as the gel strength of the material. Three punctures were made on each gel and the strength values were averaged.

The following describes the manner in which the gel strength of an injection molding composition was measured.

Annular rings, measuring 4.84 cm O.D.×3.70 cm I.D.× 0.99 cm thickness, were injection molded for the purpose of determining the as-molded gel strength of an injection molding compound.

The molded rings were mounted on a specially machined split ring which was attached to the mechanism supporting one pan of a triple beam balance. A reservoir of water was supported above the opposite pan on which an empty receptacle was placed. The balance was initially balanced to zero. As water was metered into the receptacle from the reservoir, the split ring exerted tension on the molded test ring until the ring fractured. The mass of water was then measured and the as-molded gel strength (mass per unit area) was calculated.

The gel-forming material is provided in an amount between about 0.5 wt % and about 6 wt % based upon the solids in the mixture. More than about 6 wt % of the gel-forming material may be employed in the mixture. Higher amounts are not believed to have any adverse impact on the process, although such amounts may begin to reduce some of the advantages produced by our novel compositions, especially with respect to the production of net shape and near net shape bodies. Most preferably, the gel-forming material comprises between about 1% and about 3% by weight of solids in the mixture.

The borate compound is provided in an amount between about 0.1 wt % and 1 wt %, preferably between 0.2 and 0.7 wt % and most preferably between 0.2 wt % and 0.5 wt % based on the amount of water in the mixture.

The mixture further comprises a gel-forming solvent; the solvent is added in an amount sufficient to dissolve the gel-forming material. While any of a variety of solvents may be employed depending upon the composition of the gel-forming material, particularly useful solvents for agaroid-containing gel-forming materials are polyhedric liquids, particularly polar solvents such as water or alcohols. It is, however, most preferable to employ a solvent which can also perform the dual function of being a carrier of the mixture, thus enabling the mixture to be easily supplied to a mold. We have discovered that water is particularly suited for serving the dual purpose noted above.

A liquid carrier is normally added to the mixture to produce a homogeneous mixture of the viscosity necessary to make the mixture amenable to being molded by the desired molding process. Ordinarily, the liquid carrier is added in an amount that is necessary to produce a homogeneous mixture and to ensure the proper fluidity of the mixture. Generally, the amount of a liquid carrier is an amount between about 40% to about 60% by volume of the mixture depending upon the desired viscosity thereof less the amount of solvent employed to dissolve the gel-forming material. In the case of water, which performs the dual function of being a solvent and a carrier for agaroid-containing mixtures, the amount is simply between about 40% and about 60% by volume of the mixture, with amounts between about 45% and about 55% by volume being preferred. In addition, because of its low boiling point, water is easily removed from the self-supporting body prior to and/or during firing.

The mixture may also contain a variety of additives which can serve any number of useful purposes. For example, dispersants may be employed to ensure a more homogeneous mixture. Biocides may be used to inhibit bacterial growth in the molding compositions, in particular if they are to be stored for a long period of time.

The components of the molding formulation are compounded in a heated blender that provides shearing action thereto creating a homogeneous mixture of high viscosity. The shearing action is instrumental in producing compositions of high solids loading in a dispersed and uniform state, highly suitable for subsequent injection molding. Ability to form uniform compositions of high solids loading is desirable in the production of injection molded parts. Use of compositions with high solids concentration results in lower shrinkages when the molded parts are dried and fired, facilitating dimensional control and mitigating the tendency for cracks to form during the densification process. The benefits afforded by this process include higher yields of acceptable product and lower scrap rates. This can have a significant effect on the cost of the overall process and may determine whether injection molding is lower in cost relative to other fabrication processes for a particular component.

As practiced in the current invention, the blended composition containing the components of the ceramic and/or metal powder(s), water, dispersant, other additives, if used, and the agaroid was removed from the blender after cooling to a temperature below the gel point of the agaroid, and further shredded to form a material having a particulate consistency. This was especially useful in producing material in a form convenient for molding in conventional injection molding machines, and for being able to store the material for molding at a later date. Alternatively, the material after blending could be granulated before cooling, e.g., by passing the material directly through an extruder and cutting the extrudate as it exits the die.

The mixture is transported to the mold at a temperature above the gel point (temperature) of the gel-forming material. Ordinarily, the gel point of the gel-forming material is between about 100° C. and about 600° C., and most preferably is between about 30° C. and about 45° C.

The mixture is supplied to the mold by any of a variety of well known techniques including gravity feed systems, and pneumatic or mechanical injection systems. Injection molding is the most preferred technique because of the fluidity and low processing temperatures of the mixtures. The latter feature, low processing temperatures, is especially attractive in reducing the thermal cycling (thus increasing mold life) to which molds of the injection equipment are subjected.

A wide range of molding pressures may be employed. Generally, the molding pressure (hydraulic) is between about 100 psi and about 2000 psi, although higher or lower pressures may be employed depending upon the molding technique used. Most preferably, the molding pressure is in the range of about 150 psi to about 800 psi.

The mold temperature must, of course, be at or below the gel point of the gel-forming material in order to produce a self-supporting body. The appropriate mold temperature can be achieved before, during or after the mixture is supplied to the mold. Ordinarily, the mold temperature is maintained at less than about 40° C., and preferably is between about 150° C. and about 250° C. Thus, for example, it is expected that optimum production rates would be achieved with an injection molding process wherein the preferred gel-forming materials (which exhibit gel points between about 300° C. and about 45° C.) are employed to form a mixture, and wherein the mixture is injected at less than 100° C. into a mold maintained at about 25° C. or less.

After the part is molded and cooled to a temperature below the gel point of the gel-forming material, the green body is removed from the mold. The green body is then dried and placed directly into the furnace for firing.

In the furnace, the body is fired to produce the final product. The firing times and temperatures (firing schedules) are regulated according to the powdered material employed to form the part. Firing schedules are well known in the art for a multitude of materials and need not be described herein. Because of the use of the novel molding composition of the present invention, no supporting materials are required during firing. Ordinarily for wax-based systems, an absorbent, supporting powder is employed to assist in removing the wax from the part and to aid in supporting the part so that the intended shape of the product is maintained during firing. The present invention eliminates that need for such materials.

The fired products produced by the present invention result in very dense, net or near net shape products.

The following examples are presented in order to provide a more complete understanding of the invention. The specific techniques, conditions, materials and reported data set forth to illustrate the invention are exemplary and should not be construed as limiting the scope of the invention.

EXAMPLES

Alumina Compositions

Example 1—Batch 30

Molding Compound Preparation: The following ceramic powders were milled in a ball mill for 24 h at 65 wt % solids containing 0.22 wt % Dispex A-40 dispersant: 1800.2 g aluminum oxide, 28.2 g dolomite, 124.8 g kaolin and 46.8 g talc. After milling, the slurry was added to a sigma blender and mixed for 30–40 min at 85° C. while 56 g agar was introduced into the mix.

After the batch was allowed to cool, it was removed from the blender, shredded, adjusted to 77.8 wt % solids by evaporation of water and molded in a 15-ton Boy injection molding machine. Strengths were determined on five as-molded annular rings 4.84 cm O.D. ×3.70 cm I.D.×0.99 cm thickness. The average strength was 540±20 g/cm².

Plates measuring 0.635 cm×4.826 cm×6.35 cm were molded, dried and fired at 1515° C./2 h. The average density of seven plates was 3.692±0.018 g/cm³.

Example 2—Batch 12

The procedures of Example 1 were followed except that 3.8 g zinc borate (Alfa Aesar, CAS #12536-65-1) was added to the blender. The batch was molded at 75 wt % solids. The as-molded strength of 16 annular rings was 948±63 g/cm². The density of four plates fired at 1510° C. for 2 h was 3.672±0.003 g/cm².

Example 3—Batch 28

The procedures of Example 1 were followed except that 2.7 g calcium borate (Pfaltz & Bauer CAS #12007-56-6) was used. The batch was molded at 75.8 wt % solids. The as-molded strength of nine annular rings was 879±56 g/cm². The density of six plates fired at 1510° C. for 2 h was 3.696±0.010 g/cm².

Silicon Nitride Compositions

The following examples illustrate the enhancement in gel strength obtained in silicon nitride formulations.

Example 4—Batch T3

A silicon nitride slip was prepared in a ball mill containing 1870 g silicon nitride powder, 70 g magnesium aluminate, 70 g yttrium oxide, 857 g deionized water and 3.64 g Darvan® 821A. The pH of the slip was adjusted to 9.5 using TMA and the slip was milled for 5 h. Before being added to the jar mill, the magnesium aluminate was calcined at 1282° C. The milled slip was added to a heated sigma blender with 42.85 g agar and the mixture blended for 30 min. After cooling, the batch was removed from the blender and shredded. The final solids content desired was adjusted by evaporation of water from the shredded batch. The batch was molded at 74.5 wt % solids. The as-molded strength of two annular rings was 520±106 g/cm².

Example 5—Batch T1

A jar mill was prepared using 1870 g silicon nitride powder, 70 g magnesium aluminate, 70 g yttrium oxide, 857 g deionized water and 3.64 g Darvan® 821A. The pH of the slip was adjusted to 10.2 using TMA and the slip was milled for 5 h. Before being added to the jar mill, the magnesium aluminate was calcined at 1282° C. and the yttrium oxide calcined at 1350° C. The milled slip was added to a heated sigma blender with 68.56 g agar and the mixture blended for 30 min. After cooling, the batch was removed from the blender and shredded. The final solids content desired was adjusted by evaporation of water from the shredded batch. The batch was molded at 74.5 wt % solids. The as-molded strength of six annular rings was 550±107 g/cm².

Magnesium borate was used in Examples 6 and 7.

Example 6—Batch T2

Silicon nitride powder, 1870 g, 70 g magnesium aluminate, 70 g yttrium oxide, 857 g deionized water and 1.82 g Darvan® 821A were added to a jar mill. The pH of the slip was adjusted to 10.2 using TMA and the slip was milled for 14 h. Before being added to the jar mill, the magnesium aluminate was calcined at 1282° C. and the yttrium oxide calcined at 1350° C. The milled slip was added to a heated sigma blender with 42.85 g agar, 3.42 g magnesium borate (Pfaltz & Bauer, CAS #13703-82-7) and the mixture blended for 30 min. After cooling, the batch was removed from the blender and shredded. The final solids content desired was adjusted by evaporation of water from the shredded batch. The batch was molded at 74.5 wt % solids. The as-molded strength of six annular rings was 1053±97 g/cm$^2$.

Example 7—Batch T7

A jar mill was prepared using 1870 g silicon nitride powder, 70 g magnesium aluminate, 70 g yttrium oxide, 857 g deionized water and 3.64 g Darvan® 821A. The pH of the slip was adjusted to 10.2 using TMA and the slip was milled for 14 h. Before being added to the jar mill, the magnesium aluminate was calcined at 1282° C. The milled slip was added to a heated sigma blender with 68.56 g agar, 3.42 g magnesium borate and the mixture blended for 30 min. After cooling, the batch was removed from the blender and shredded. The final solids content desired was adjusted by evaporation of water from the shredded batch. The batch was molded at 74.5 wt % solids. The as-molded strength of six annular rings was 1313±79 g/cm$^2$.

Having thus described the invention in rather full detail, it will be understood that various changes and modifications may suggest themselves to one skilled in the art, all falling within the invention as defined by the subjoined claims.

What is claimed is:

1. A process for shaping parts from ceramic and metal powders which comprises the steps of:

(a) forming a mixture comprising ceramic and/or metal powder(s), a gel-forming material chosen from the class of polysaccharides known as agaroids, a gel-forming material solvent, and a gel strength enhancing agent having the form of a borate compound selected from the group consisting of calcium borate, magnesium borate, zinc borate, ammonium borate, tetraethylammonium borate, tetramethylammonium borate and boric acid, the mixture being formed in a blender that provides shearing action thereto and the blender being heated to raise the temperature of the mixture to about 70° C. to 100° C.;

(b) supplying the mixture to a mold; and (c) molding the mixture under conditions of temperature and pressure to produce a self-supporting structure.

2. A process as recited by claim 1, wherein said blender is heated to raise the temperature of the mixture to about 80° C. to 95° C.

3. An injection molding process comprising the steps of;

(c) forming a mixture comprising ceramic and/or metal powder(s), a gel-forming material chosen from the class of polysaccharides known as agaroids, a gel-forming material solvent and a gel strength enhancing additive having the form of a borate compound selected from the group consisting of calcium borate, magnesium borate, zinc borate, ammonium borate, tetraethylammonium borate, tetramethylammonium borate and boric acid, the mixture being formed in a blender that provides shearing action thereto and the blender being heated to raise the temperature of the mixture to about 70° C. to 100° C.;

(d) injecting the mixture at a temperature above the gel point of the gel-forming material into a mold;

(e) cooling the mixture in the mold to a temperature below the gel point of the gel-forming material to produce a self-supporting structure; and (f) removing the structure from the mold.

* * * * *